Jan. 29, 1957 W. P. HUNSDORF 2,779,886
ARMATURE WINDING METHOD
Original Filed Jan. 4, 1950

INVENTOR.
WILLIAM P. HUNSDORF
BY
Oberlin + Limbach
ATTORNEYS

United States Patent Office 2,779,886
Patented Jan. 29, 1957

2,779,886

ARMATURE WINDING METHOD

William P. Hunsdorf, Cleveland, Ohio, assignor to Cleveland Electrical Equipment Co., Inc., Cleveland, Ohio, a corporation of Ohio Original application January 4, 1950, Serial No. 136,767, now Patent No. 2,718,359, dated September 20, 1955. Divided and this application July 26, 1955, Serial No. 524,566

7 Claims. (Cl. 310—265)

The present invention relates as indicated to an armature winding method and, more particularly, to an armature winding method which involves the "basket weave" principle of winding which is generally disclosed in my prior Patents Nos. 2,381,750, dated August 7, 1945; and No 2,632,603, dated March 24, 1953. The present application is a division of my copending application, Serial No. 136,767, filed January 4, 1950, now Patent No. 2,718,359, dated September 20, 1955.

A primary object of this invention is to provide an improved armature winding method which results in the tight and uniform winding of all of the coils, the end loops of the coil which are tightly interwoven and interlaced to secure a perfect symmetry thereof and thereby resist the tendency of the armature to breath or expand under the influence of centrifugal force. Furthermore, the present winding method results in coils of equal length, whereby sparking is reduced to a minimum at the commutator and the armatures thus wound are statically and dynamically balanced.

A further object is to provide an improved armature winding method which results in the winding of coils having end loops disposed on opposite sides of the armature shaft, such winding further lacing and locking the conductor wires in place against centrifugal force and minimizing the buildup of coil ends, whereby to provide a compact end structure on the armature.

Still another object of this invention is to provide an armature winding method in which the interlaced and interwoven end loops of the armature coils afford ventilation for dissipation of heat generated in the armature during its use in a motor, a generator, or the like.

Another object of this invention is to provide an armature having superior electrical and mechanical characteristics achieved by the novel winding method herein.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 14:
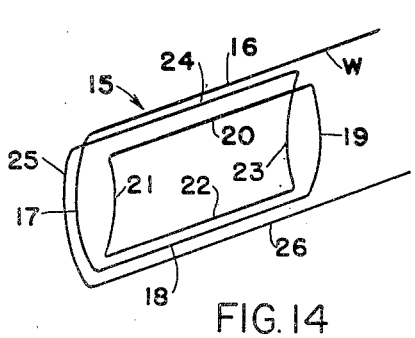
Figure 13:
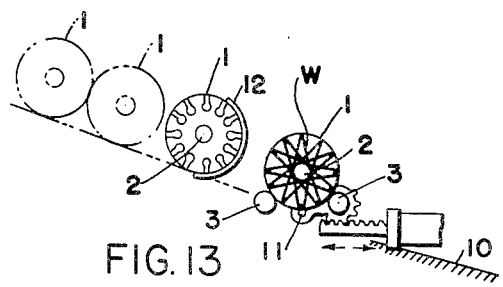

In said annexed drawings:

Figs. 1 through 13 illustrate the successive steps in the winding of an armature according to the present method; and Fig. 14 is a perspective view of one form of armature coil wound according to the present method.

By way of preliminary discussion, the armature core 1 to be wound may be of conventional form such as illustrated in Figs. 1 to 13, and preferably comprising a shaft 2 on which the laminated and slotted armature body is tightly fitted, said body as shown being formed with slots axially therethrough (straight or skewed) into which wire coils are adapted to be wound. If desired, the wires in the wound armature may be held in place by insulating wedges or the like and usually each slot of the armature body is lined with an insulating sleeve prior to commencing the winding operations.

As will hereinafter appear, all of the wires W are fed into the slots 4 and across the ends of the armature body simultaneously, each coil extending through one slot, across one side of the shaft 2, through another slot (usually diametrically opposed to the first slot), and thence across the opposite side of the shaft 2 back to the first slot. Successive turns of each coil extend similarly with the exception that the next succeeding turn has its end loops disposed on the opposite sides of the shaft relative to the preceding turn whereby to effect balanced and compact winding. The interweaving and interlacing of the coil ends and the simultaneous winding of all coils produces an armature having superior characteristics with regard to ventilation, dynamic and static balance, uniform length of coils to minimize sparking at the commutator, and reduction to a minimum the breathing of the coils due to the influence of centrifugal force.

The apparatus for winding an armature as above described is fully illustrated and described in the parent application Serial No. 136,767, filed January 4, 1950, and thus need not be repeated herein. However, there is shown herein some of the basic elements of the apparatus such as the armature loading and unloading mechanisms, the wire gripping and cutting unit, the axial wind and roll-over mechanism and, the winding head and wire feed finger assembly.

*Outline of winding steps*

Figure 1:
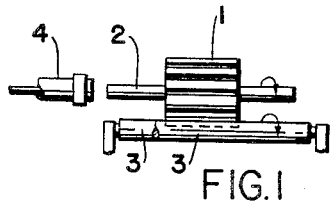
Figure 2:
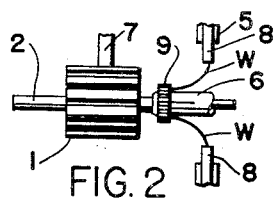
Figure 3:
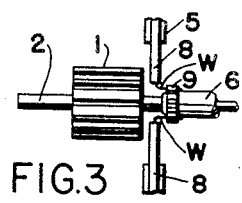
Figure 4:
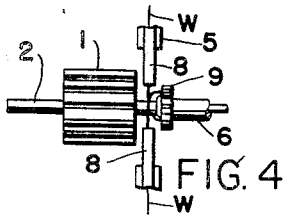
Figure 5:
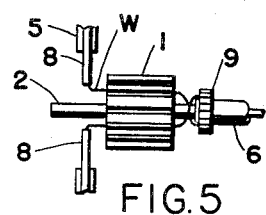
Figure 6:
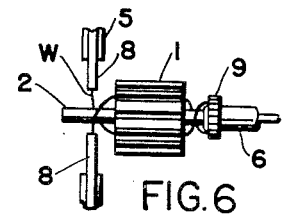
Figure 7:
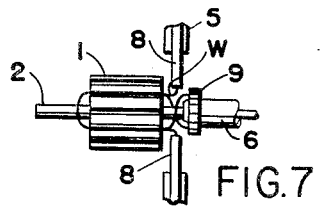
Figure 8:
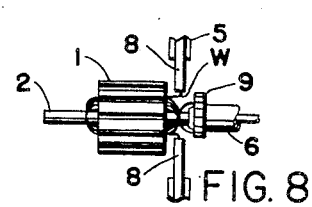
Figure 9:
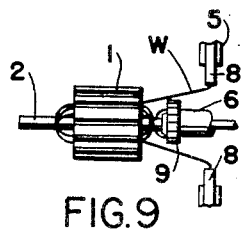
Figure 10:
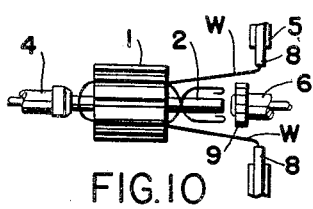
Figure 11:
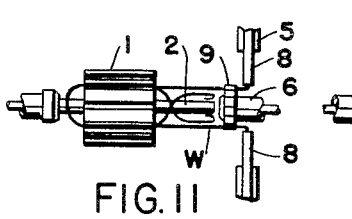
Figure 12:
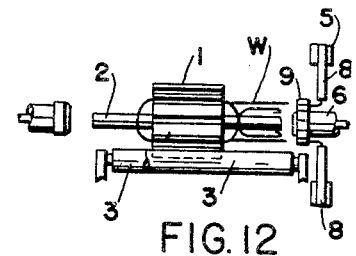

Following is an outline of the successive armature winding steps from beginning to end as illustrated in Figs. 1 to 13 inclusive:

1. Place an unwound armature 1 between parallel rotating rollers 3 to induce rotation of the armature about its longitudinal axis, as illustrated in Fig. 1 (see also Figs. 12 and 13);

2. Move a loading ram 4 toward the right to thereby push the armature 1 toward the winding head 5 and into the collet of a main chuck shaft 6, as shown in Fig. 2. During such movement of the armature, the slot indicator 7 will enter one of the slots thereof to thereby arrest rotation and to position the slots in the armature in register wtih the radially positioned tubular wire feed fingers 8 of winding head 5. With the armature thus positioned, the loading ram 4 is retracted to its starting position as illustrated in Fig. 1;

3. Close the collet of the main shaft 6 on the inserted end of armature shaft 2 and retract said main shaft 6 to thus position the wire gripping and cutting head 9 thereof to one side of the winding head 5 and the armature 1 on the other side as illustrated in Fig. 3;

4. Move the feed fingers 8 radially inward to meet the slots in the armature as shown in Fig. 3;

5. Rotate main shaft 6 180° to pull the wires W through the feed fingers 7 from supply spools and to thereby lace the wires W as shown in Fig. 4;

6. Move the main shaft 6 axially to draw the armature 1 through the winding head 5 as shown in Fig. 5 to thus cause the feed fingers 8 to pass through the slots in the armature body and to lay the wires W into the armature slots;

7. Rotate the main shaft 6 and armature 180° in the same direction as before to thus interlace and interweave the wires at the coil ends as shown in Fig. 6;

8. Move the main shaft 6 axially in an opposite direction to position the armature 1 as shown in Fig. 7 in which the feed fingers 8 have again passed through the slots of the armature core but this time through slots diametrically opposed to those traversed in step 6;

9. Repeat the preceding steps 5-8 except now turn the shaft 6 180° twice in the opposite direction. Then repeat steps 5-8 as often as required, alternately reversing the direction of roll-over after each two roll-overs in one direction;

10. After the armature 1 has been completely wound with the desired number of turns, the same will be in the position illustrated in Fig. 8, that is, the armature 1 will be disposed on one side of the winding head 5 and the gripping and cutting unit 9 will be disposed on the opposite side of said winding head;

11. Move feed fingers 8 radially outward and move the main shaft 6 to its home position as illustrated in Fig. 9;

12. Open wire cutting and gripping unit 9 and move the loading ram 4 to its forward position to grip the shaft 2 of the wound armature and draw the latter toward the left as shown in Fig. 10 to withdraw the released wires W from the wire gripping and cutting unit 9;

13. Move the feed fingers 8 radially inward to position the outer wires W in the wire cutting and gripping unit 9 as shown in Fig. 11;

14. Close the wire cutting and gripping unit 9 to cut the outer wires W, and after such wires W are cut, draw the wound armature 1 to the left by means of the loading ram 4, the armature being released from ram 4 prior to the time that the latter reaches its home position as shown in Fig. 12. When the outer wires W are cut as aforesaid, the ends leading through feed fingers 8 are gripped in the wire gripping and cutting unit 9 ready for starting of the winding of a succeeding armature 1;

15. Kick the wound armature 1 onto the discharge chute 10 as by the piston actuated pin 11 shown in Fig. 13 and rotate the semi-cylindrical bucket 12 to place a new armature 1 into the starting position between rotating rolls 3.

The foregoing operations are then repeated, the machine including suitable timing and sequence control mechanism (not shown herein) so that no handwork is required; and of course once the machine has been set up, armatures can be continuously wound except during brief intervals while new wire supply reels are loaded onto a reel carrier (not shown herein) and the wires threaded through the feed fingers 8, and placed into the wire cutting and gripping unit 9, the latter then being shifted to closed position to grip the wires.

*Distributed windings (Fig. 14)*

The foregoing description of the construction and operation of the machine was concerned with the winding of armature coils into diametrically opposite slots but as will hereinafter appear the windings may be disposed otherwise.

For example, as shown in Fig. 14, each coil 15 may be of the distributed vertical V-type in which the portion 16 is laid into one slot of the armature core, the portion 17 at one end of the armature passes on one side of the armature shaft to a diametrically opposite slot, the portion 18 passes through such diametrically opposite slot, the portion 19 at the other end of the armature body passes on the other side of the armature shaft to a slot next adjacent the slot through which the portion 16 passes, the portion 20 passes through such adjacent slot, the portion 21 at such one end of the armature passes on the side of the shaft opposite to portion 17, the portion 22 passes through the same slot as portion 18, the portion 23 at such other end of the armature passes on side of the shaft opposite to portion 19, and the portions 24, 25, and 26 are the same as the portions 16, 17, 18, respectively, such winding being continued until the coil 15 has the desired number of turns.

Distributed winding as aforesaid is readily accomplished by rendering the roll-over control mechanism for shaft 6 operative to first roll over the shaft 6 180° in one direction, less than 180° in the same direction, less than 180° in the opposite direction, and 180° in such opposite direction, and repeating such roll-over steps as often as required.

In addition to the aforesaid method of distributed winding it is feasible in some instances to skip one or more slots between the portion 20 and the portions 16 and 24.

It has been found that in some armatures distributed windings have certain advantages such as increased efficiency by reason of shorter copper and thus reduced $I^2R$ loss. Moreover, the shape and size of end build-up of the coils can be controlled, by varying the type of winding. For example, winding as in Figs. 1–13 forms ends of rounded or hyperbolic form whereas winding as in Fig. 14 forms ends of a more square or blunt form and shorter in a direction axially of the armature 1.

Other modes of applying the principle of the invention may be employed, change being made as regards the details described, provided the features stated in any of the following claims, or the equivalent of such, be employed.

I therefore particularly point out and distinctly claim as my invention:

1. The method of winding an armature of the character wherein the body thereof is formed with wire receiving slots extending from one end to the other which comprises the steps of gripping the ends of a plurality of radially inwardly extending wires, winding the wires into coils on such armature by laying the wires in one direction into the wire receiving slots, across one end of the armature body, in the other direction into the slots, and across the other end of the armature body, repeating the aforesaid winding operation until the coils have a desired number of turns and until the finishing ends of the wire coils are at the same end of the armature body as the gripped wires, releasing the gripped ends of the wires, and cutting the finishing ends of the wire coils thus wound whereby to release the wound armature.

2. The method of winding an armature of the character wherein the body thereof is formed with wire receiving slots extending from one end to the other which comprises the steps of providing a series of radially positioned wire feed members through which wires are adapted to be pulled radially inward toward a common axis, gripping the inner ends of such wires, winding the wires into coils on such armature by laying the wires in one direction in the armature slots, across one end of the armature body, in the other direction into the slots, and across the other end of the armature body, repeating the aforesaid winding operation until the coils have a desired number of turns and until the finishing ends of the coils are at the same end of the armature body as the gripped wires, releasing the gripped ends of the wires, and cutting the finishing ends of the coils thus wound at points between the armature body and such series of wire feed members whereby to release the wound armature.

3. The method of winding an armature of the character wherein the body thereof is formed with wire receiving slots extending from one end to the other which comprises the steps of providing a series of radially positioned wire feed members through which wires are adapted to be pulled radially inward toward a common axis, gripping the inner ends of such wires, winding the wires into coils on such armature by laying the wires in one direction in the armature slots, across one end of the armature body, in the other direction into the slots, and across the other end of the armature body, repeating the aforesaid winding operation until the coils have a desired number of turns and until the finishing ends of the coils are at the same end of the armature body as the gripped wires, releasing the gripped ends of the wires, cutting the finishing ends of the coils thus wound at points between the armature body and such series of wire feed members whereby to release the wound armature, and at the same time that the finishing ends of the coils are cut gripping the adjacent cut ends of the wires preparatory to the winding of the next armature.

4. In the method of winding an armature having a body formed with wire receiving slots extending from one end to the other and having a shaft extending through the body and projecting axially beyond the ends thereof wherein a plurality of wire coils are simultaneously wound into the wire receiving slots of the body and across the ends of said body by alternately reciprocating and rotating the armature body with respect to a corresponding series of radially positioned wire feed members through which the wire is pulled responsive to such reciprocatory and rotary movements, the improvement which comprises rotating the armature body twice in succession in one direction and twice in succession in the opposite direction, whereby the end loops of successive turns of the coils at opposite ends of said body are disposed on opposite sides of said shaft.

5. An armature for electrical apparatus comprising a body formed with a series of diametrically opposed slots extending from one end to the other of said body, a shaft in said body extending beyond the ends of said body, and wire coils in diametrically opposed slots of said body each having end loops of successive turns at opposite ends of said body disposed on opposite sides of said shaft.

6. An armature for electrical apparatus comprising a body formed with a series of diametrically opposed slots extending from one end to the other of said body, a shaft in said body extending beyond the ends of said body, and wire coils in diametrically opposed slots of said body having end loops of one turn at opposite ends of said body disposed on opposite sides of said shaft and the end loops of the next succeeding turn also disposed on opposite sides of said shaft but opposite with respect to the disposition of the end loops of the preceding turn.

7. An armature for electrical apparatus comprising a body formed with wire receiving slots extending from one end to the other of said body, a shaft in said body extending beyond the ends of the latter, and wire coils each wound in at least two slots of said body and each coil having end loops of successive turns at opposite ends of said body disposed on opposite sides of said shaft.

References Cited in the file of this patent

UNITED STATES PATENTS 2,561,562    Collins _____ July 24, 1951